(12) United States Patent
Leong et al.

(10) Patent No.: US 8,537,697 B2
(45) Date of Patent: Sep. 17, 2013

(54) PACKET TIMING MEASUREMENT

(75) Inventors: Patrick Pak Tak Leong, Palo Alto, CA (US); Murali R. Bommana, Fremont, CA (US)

(73) Assignee: Gigamon Inc., Milpitas, CA (US)

( * ) Notice: Subject to any disclaimer, the term of this patent is extended or adjusted under 35 U.S.C. 154(b) by 508 days.

(21) Appl. No.: 12/709,049

(22) Filed: Feb. 19, 2010

(65) Prior Publication Data

US 2011/0205912 A1 Aug. 25, 2011

(51) Int. Cl.
*H04L 12/26* (2006.01)

(52) U.S. Cl.
USPC ............................................ 370/252; 370/503

(58) Field of Classification Search
USPC ................. 370/252, 253, 328–338, 400, 401, 370/503–516
See application file for complete search history.

(56) References Cited

U.S. PATENT DOCUMENTS

| 2002/0093917 | A1* | 7/2002 | Knobbe et al. | 370/252 |
| 2002/0152271 | A1* | 10/2002 | Chafle et al. | 709/204 |
| 2007/0153772 | A1* | 7/2007 | Shankar J et al. | 370/352 |
| 2008/0089239 | A1* | 4/2008 | Todd et al. | 370/252 |
| 2010/0034170 | A1* | 2/2010 | Hirano et al. | 370/331 |

* cited by examiner

*Primary Examiner* — Pao Sinkantarakorn
(74) *Attorney, Agent, or Firm* — Vista IP Law Group, LLP

(57) ABSTRACT

A method and apparatus for performing packet time measurements. In one embodiment, the method comprises transmitting a packet in the network from a sender to a receiver through a plurality of devices; creating a plurality of packets by copying the packet at each of the plurality of devices as the packet is being transmitted through the plurality of devices, including adding a time stamp to each packet in the plurality of packets, wherein time stamps of plurality of packets are generated with data from time stamp engines synchronized to a global clock; sending the plurality of packets with their time stamps to a tool; and performing analysis on the plurality of packets using the tool.

27 Claims, 7 Drawing Sheets

PACKET TIMING MEASUREMENT

FIELD OF THE INVENTION

The present invention generally relates to packet switch network technology, and more particularly to performing packet timing measurements in a network utilizing a packet switch and a time stamping mechanism.

BACKGROUND OF THE INVENTION

In network communication, a sending device sends messages to a receiving device as part of a communication flow. These messages are sent through a number of network devices such as routers and switches to travel from their source to their destination. In a packet-switching network, the transmission, routing, forwarding, and the like of messages between the terminals in the packet-switching network are divided into one or more packets. Thus, all the packets must proceed through these network devices to arrive at the destination.

A common complaint from users of computer networks is that an application is slow. For example, the Outlook response is slow or that the browser is slow. From a network provider and operator standpoint, it is very useful a determination can be made as to which network segment is having a bottleneck. Often times, switches and routers through which packets associated with the applications travel are geographically spread out, thereby making it difficult, if not impossible, to put personnel at each network segment to trace out the timing of the packet so that bottlenecks can be identified.

SUMMARY OF THE INVENTION

A method and apparatus for performing packet time measurements. In one embodiment, the method comprises transmitting a packet in the network from a sender to a receiver through a plurality of devices; creating a plurality of packets by copying the packet at each of the plurality of devices as the packet is being transmitted through the plurality of devices, including adding a time stamp to each packet in the plurality of packets, wherein time stamps of plurality of packets are generated with data from time stamp engines synchronized to a global clock; sending the plurality of packets with their time stamps to a tool; and performing analysis on the plurality of packets using the tool.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
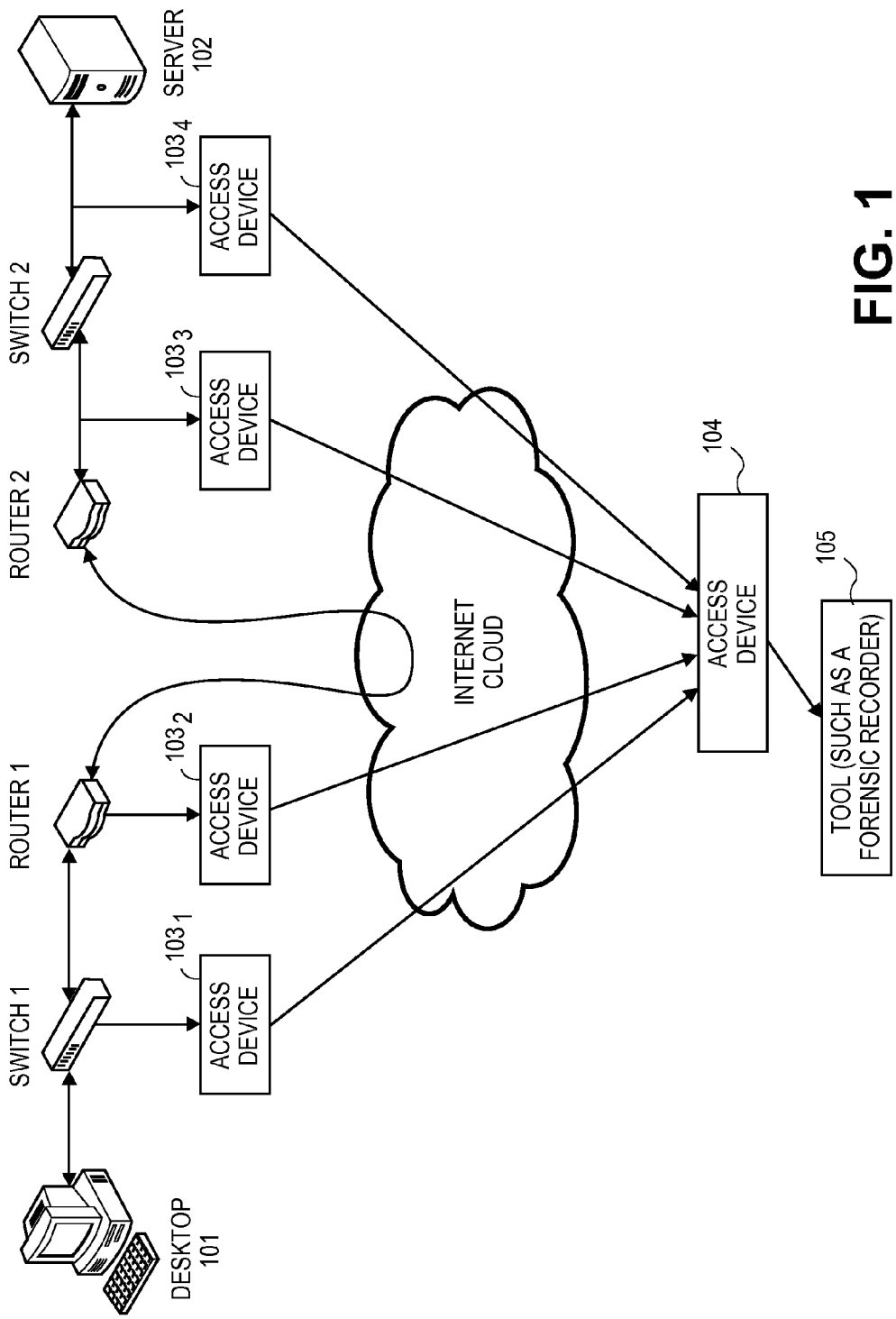
FIG. 1 illustrates one embodiment of a network arrangement.

A system and apparatus for performing packet measurements are described. In one embodiment, the packet measurements are made on packets that have time stamps included therein. The time stamps that are used have a very high accuracy. In one embodiment, the time stamps are added to copies of packets in a communication flow, and not the original packets. Therefore, the techniques described herein are out-of-band packet measurement techniques. Furthermore, by adding the time stamps to copies of the packets, those packets may be sent to a tool for analysis without disrupting the communication flow.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

OVERVIEW

The techniques described herein involve putting a very accurate, GPS synchronized time stamping engine to a data access device and having multiple data access devices deployed along the path of a communication flow. In one embodiment, the data access device is an out-of-band data access box that takes packets from various network segments and intelligently delivers to one or more tools. In one embodiment, the data access device provides aggregation, multicasting and filtering of the traffic at line rate before delivering the packets to the tools.

In one embodiment, the time stamp engine puts a time stamp tag on the packet as it enters the data access device either through the span port of a switch or router, or through a tap or a tapping module in the data access device. The timestamp value is very accurate. The timestamp engines of multiple data access devices can be synchronized via methods such as, for example, but not limited to GPS, IEEE 1588 or an external time server such as a NTP timer server. FIG. 1 illustrates these techniques in conjunction with a communication flow in a network.

Referring to FIG. 1, there are multiple network devices coupling the sender, desktop computer system 101, and the receiver, server 102, to transmit a packet from a sender to the receiver through these network devices. As shown in FIG. 1, the network devices include switch 1, router 1, router 2 and switch 2, and the communication flow is goes from desktop computer 101 through switch 1, router 1, the Internet, router 2, and switch 2 before arriving at server 102.

At least two of the network devices are operable to create a copy of one or more packets in the communication flow as the packet is being transmitted. In FIG. 1, each of switch 1, router 1, router 2 and switch 2 causes a copy of packets in the communication flow to be created and forwards them to individual access devices, such as access devices $103_{1-4}$. The copies may be made by each of these multiple devices, by an individual network device that has a span port and the span port is connected to a data access device (where the network device sends a copy of the packet to the data access device), or by a tap module of the data access device that is located on the path between two adjacent network devices where the data access device makes a copy of each packet passing through in each direction. Each of access devices contains a packet switch with a time stamping engine coupled thereto (or incorporated therein). The packet switch delivers each of the packets to the timestamping engine which in one embodiment resides on a separate board, which is operable to cause a timestamp to be added to these packets generated by their respective network device. The timestamps of these copied packets are generated using time stamping engines that synchronize to a global clock. After adding the time stamps, the packet switches of the access devices send the packets with their timestamps to a tool 105. As shown in FIG. 1, tool 105 may be remotely located and accessible through another access device, such as access device 104.

As an example, the user may access a server through some client software running on the desktop. A packet that leaves the client desktop may go through Switch 1, Router 1, then through more equipment across the Internet cloud, to Router 2, then Switch 2 and then to the server. (Notice that the description here also applies to the opposite direction for a packet going from the server to the client desktop.)

When the packet reaches Switch 1, a copy of the packet can be delivered to the network port of data access device $103_1$ via the switch's span port. Data access device $103_1$ adds a very accurate timestamp on this copy of the packet and then sends it through its tool port to data access device 104, where a tool 105 is attached. In one embodiment, data access device 104 is located remotely and is connected via a dark fiber to data access device $103_1$. In such a case, then data access device 104 sends this packet with time stamp out of its tool port to tool 105. In one embodiment, if data access device 104 is connected to the Internet cloud, then data access device $103_1$ adds routable headers to this packet so that it can be routed through the Internet cloud to data access device 104. In this case, data access device 104 removes the router headers and delivers the packet with time stamp to tool 105.

A similar set of operations occurs when the original packet reaches Router 1. A copy of the packet is delivered to the network port of data access device $103_2$ via the router's span port. Data access device $103_2$ adds a very accurate timestamp on this copy of the packet and then sends it through its tool port to data access device 104, and ultimately to tool 105.

It is also possible that the user puts a tap on the network segment between Router 2 and Switch 2. The tap can be an external tap outside of the data access device $103_3$, or the tap can be a built-in tap as part of the data access device. A copy of the packet is created and enters into the network port of data access device $103_3$. Data access device $103_3$ puts a very high accuracy timestamp to this packet and then sends it out of its tool port to data access device 104, and ultimately to tool 105.

Tool 105 receives the packets from data access devices $103_{1-4}$ and recognizes the format of the timestamp that the packet carries. If all of data access devices $103_{1-4}$ have their time stamp engine synchronized to a very accurate global clock, then tool 105 can identify the transversal time of an individual packet through the various network segments and the network operator can have a very clear idea of where a traffic bottle neck is located. This is especially useful for large telecom carriers where they own the whole network. Note that it is possible for the sender 101 to add a special signature to a packet so that this signature can be used to trace the packet as it goes through its path from desktop 101 to server 102.

Figure 2:
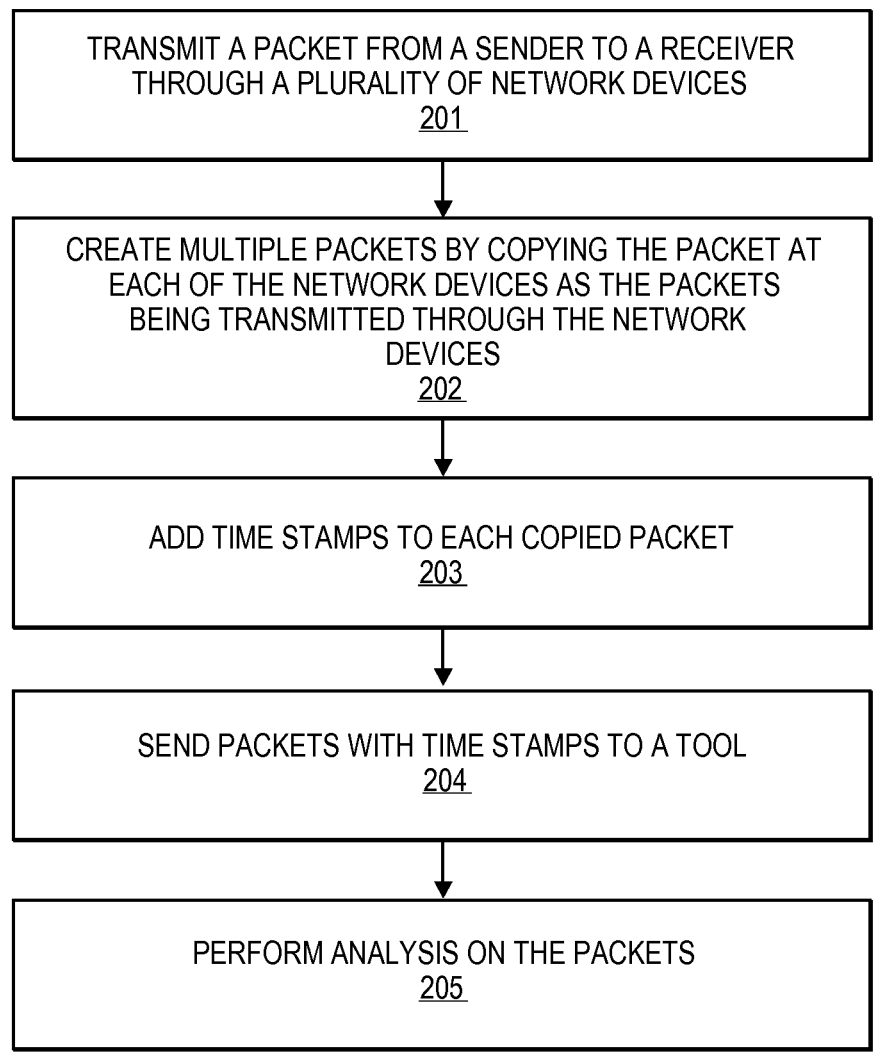
FIG. 2 is a flow diagram of one embodiment of a packet timing measurement process.

The above packet timing measurement arrangement is described in a flow diagram in FIG. 2. The operations in the flow diagram are performed by processing logic that may comprise hardware (circuitry, dedicated logic, etc.), software (such as is run on a general purpose computer system or a dedicated machine), or a combination of both.

Referring to FIG. 2, the process begins by processing logic transmitting a packet through a network from a sender to a receiver through a plurality of network devices (processing block 201). The network devices may be any devices that are used in networks, including, but not limited to switches, routers, taps, firewalls, gateways, and nodes.

Next, processing logic creates multiple packets by copying the packet at each of the network devices as the packets being transmitted through the devices (processing block 202). In one embodiment, creating the plurality of packets includes adding a timestamp to each packet, where the timestamps are generated from data from timestamp engines that are synchronized to a global clock. Alternatively, the timestamp engine may be synchronized to a local clock (getting a local time timestamp) where the local clock is synchronized to some high accuracy clock. For example, the local clock may be synchronized with the time server at NIST but the local clock gets a time zone adjusted time. As long as all local clocks are sync up to one highly accuracy time authority, then these timestamps can be used for tracing the packet response time.

In one embodiment, the timestamp engines are synchronized via GPS, IEEE 1588, a NTP timeserver or another external timeserver. In another embodiment, the timestamp is a GPS synchronized timestamp.

After adding the timestamps to the packets, the packets are sent to a tool (processing block 203). In one embodiment, the tool is a forensic recorder. In another embodiment, the tool is the processing device that can perform operations on the packets. In one embodiment, the tool is located in a network, such that the packets are sent over the network to the tool.

After receiving the packets, the tool performs analysis on the packets (processing block 204). In one embodiment, the analysis comprises time of flight analysis. This may be useful to determine a bottleneck in the network.

In an alternative embodiment, instead of having a centralized tool (which saves a lot of money for the user and operating costs), that each data access devices (e.g., data access devices $103_{1-4}$) is attached to a tool of its own such as a forensic recorder. In one such a case, the tool stores the packets with time stamps and then later on these packets from multiple tools are correlated together for analysis (e.g., time of flight analysis). In another case, the forensic recorder records the time stamp of each of the packets and can be used to determine when an event happens. This can then be used for a variety of purposes (e.g., a legal proceeding).

In another alternative embodiment, data access devices $103_{1-4}$ are configured to time stamp the packets that belong to a particular flow. In this case, the time of flight analysis is more specific and that there is less irrelevant traffic going to data access devices 104 and the tool. Thus, a packet can be inspected from its beginning to its end so that any flow that can be recognized up through the application layer can be obtained by the data access device.

Note that a tool can determine that a particular time stamped packet came from a particular network device because the data access device puts a source port ID to each packet as part of a header added to the packet. Thus, in this manner, the tool can determine where a particular packet comes from and performs the time of flight analysis.

An Example of a Data Access Device

Figure 3A:
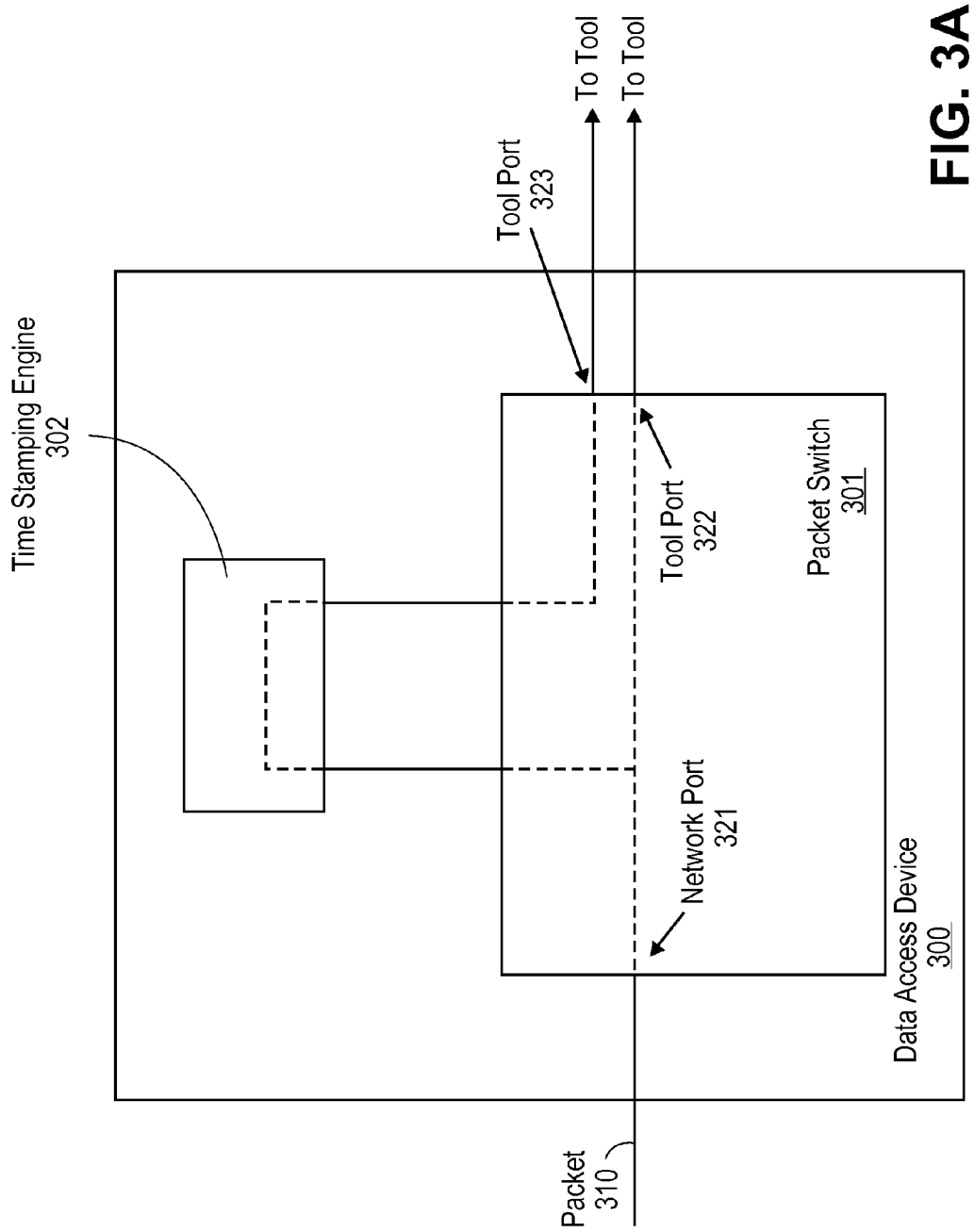
FIG. 3A illustrates one embodiment of the data access device.

FIG. 3A illustrates one embodiment of the data access device. Referring to FIG. 3A, data access device 300 includes a packet switch 301 that is operable to receive the packet, such as packet 310, on a network port 321 from a network span port and sends a copy of the packet to a tool port 322.

Packet switch 301 may send the copied packet to time stamping engine 302. In response thereto, time stamping engine 302 adds a time stamp to the packet and sends the packet with the time stamp back to packet switch 301.

If the user is using a built-in tap of the data access device 300, then as the packet enters network port 321, the data access device 300 will make a copy of the packet. The original packet will go out of a network port. The copy of the packet may be sent to the time stamping engine 302 and then back out to packet switch 301 and out of tool port 323.

Note that in one embodiment packet switch 301 and time stamping engine 302 are all within the same blade in the same chassis. In another embodiment, packet switch 301 and time stamping engine 302 are on separate blades within the same chassis. In yet another embodiment, there are multiple chassis and the packet enters one chassis which has packet switch 301, gets sent to a different chassis which also has a packet switch and time stamp engine 302, gets time stamped and then sent out to a tool. The tool may be connected to the chassis containing time stamp engine 302, or to a remote chassis.

Figure 3B:
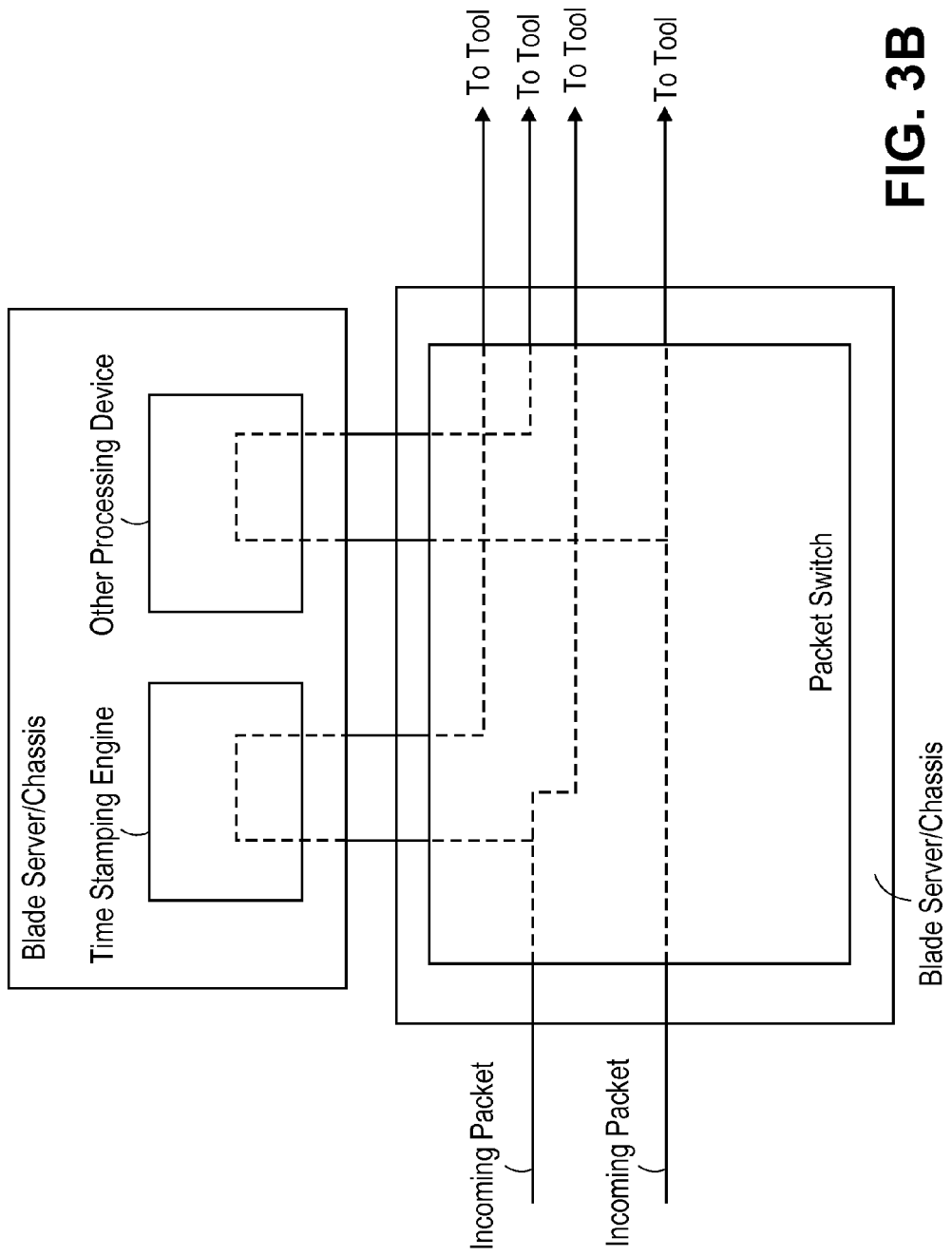
FIG. 3B illustrates an alternative embodiment of a data access device.

FIG. 3B illustrates an alternative embodiment of a data access device in which the server containing the time stamping engine includes another device. In one embodiment, the other device is another time stamping engine. In an alternative embodiment, the other device performs another function on packets received from the packet switch.

An Example of a Time Stamping Engine

Figure 4:
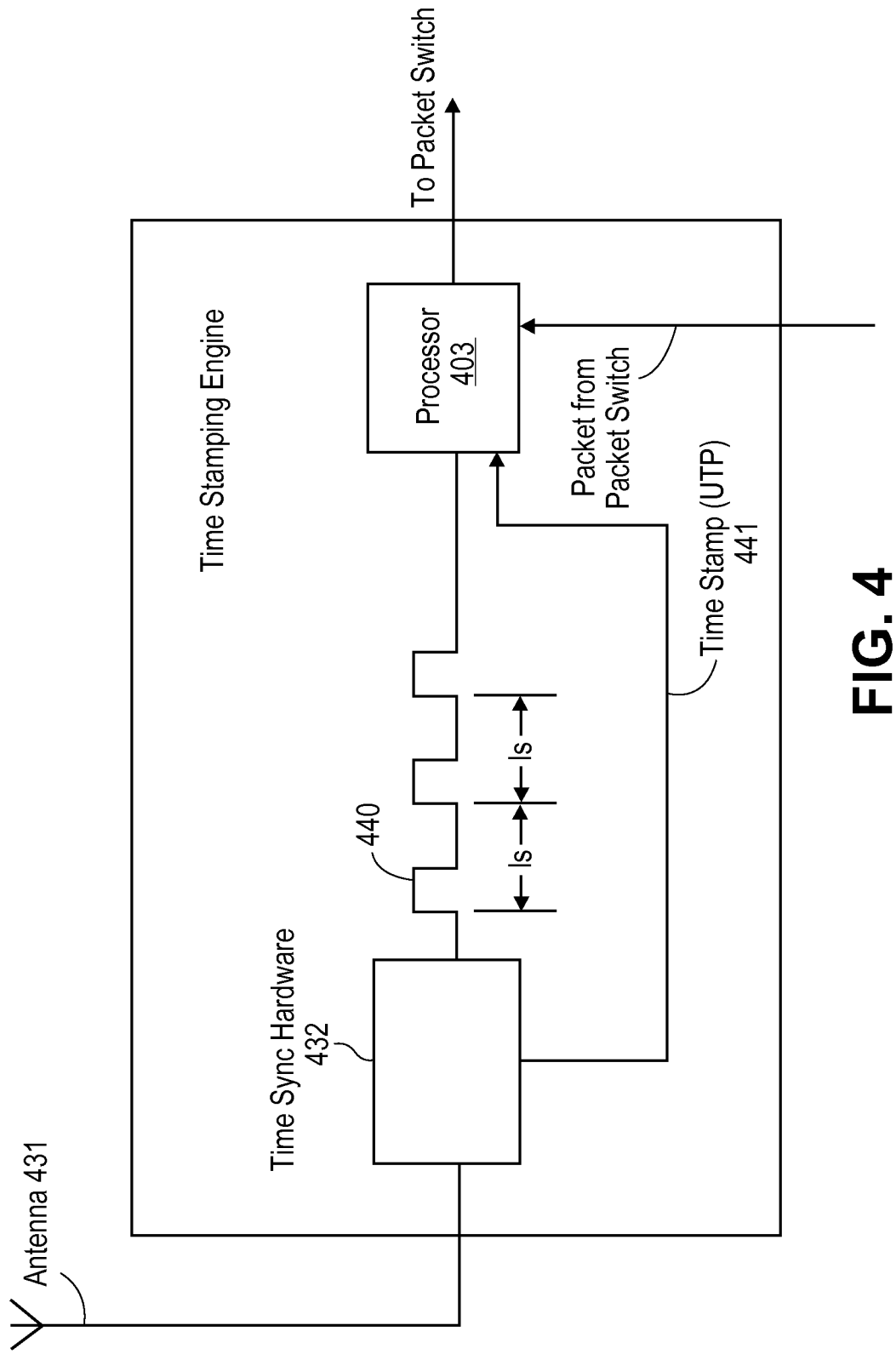
FIG. 4 is a block diagram of one embodiment of a time stamping engine.

FIG. 4 is a block diagram of one embodiment of a time stamping engine. In one embodiment, the time stamp engine is part of a blade server. Referring to FIG. 4, time stamping engine comprises an antenna 431 coupled to time synchronization hardware 432 that receives a global clock (e.g., a GPS or other global timing signal) and provides global clock to time synchronization hardware 432. In response to the global clock received by antenna 431, time synchronization hardware 432 outputs a clock signal in the form of a pulse, or tick, 440 and time stamp information 441. In one embodiment, the time information 441 represents the current UTP time. The UTP time information 441 is generated at the time of the pulse 440.

Time stamping engine 402 also includes a processor 403 that is coupled to packet switch 301 to receive the copied packet and is operable to add a time stamp to that packet. That is, using the outputs of time synchronization hardware 432, processor 403 generates a time stamp and adds the time stamp to the packet that it receives from packet switch 301. The time sync information is used to set up the local clock of the processor to a very high accuracy. Upon receiving a packet, the processor then references its local clock and adds a time stamp to the packet. The time stamp may or may not be in the local clock time value, as these are all convertible. Note that it can be UTC time or can be local time.

Processor 403 is coupled to an output port of time stamping engine 402 that is coupled to an input port of packet switch 301 to send the copied packet with the timestamp included therein to packet switch 301.

Figure 5:
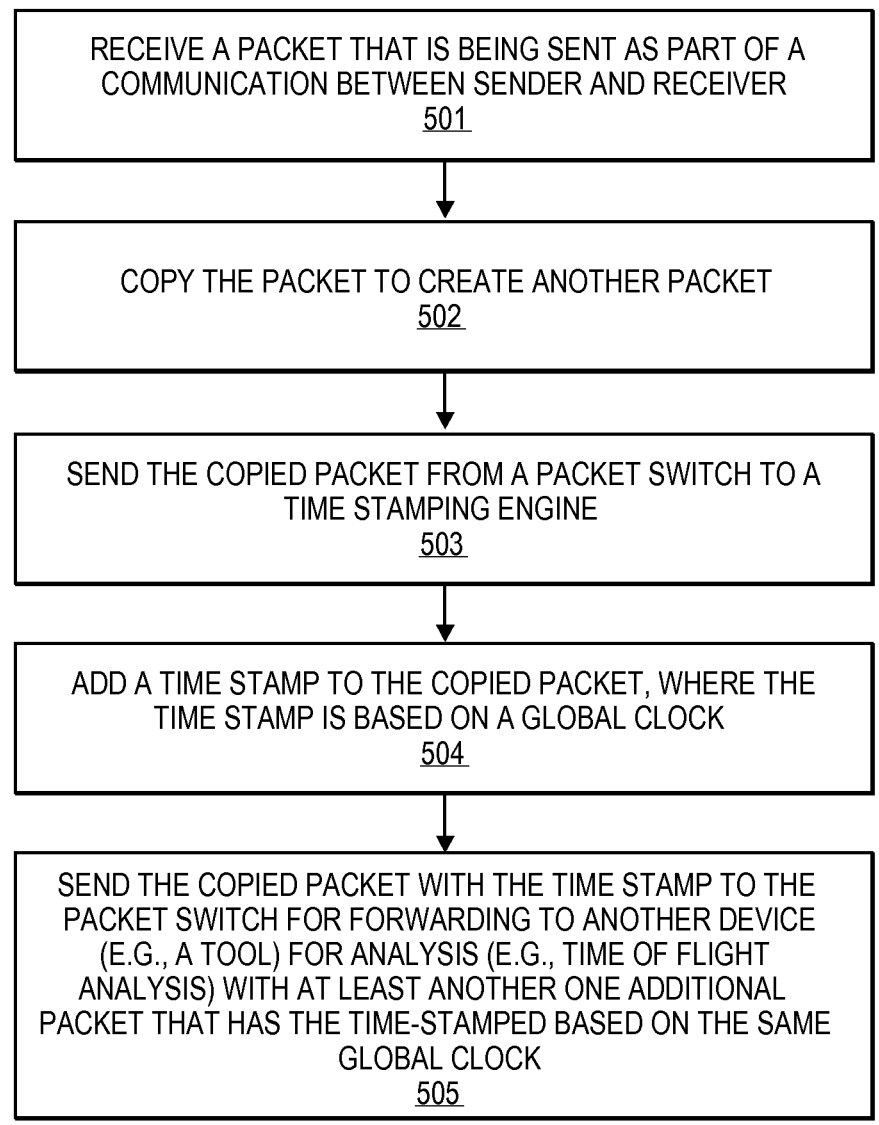
FIG. 5 is a flow diagram of one embodiment of the process performed by the data access device.

FIG. 5 is a flow diagram of one embodiment of the process performed by the data access device. Referring to FIG. 5, the process is performed by processing logic that may comprise hardware (circuitry, dedicated logic, etc.), software (such as is run on a general purpose computer system or a dedicated machine), or a combination of both.

Referring to FIG. 5, the process begins by processing logic in the packet switch receiving a packet that is being sent as part of a communication between sender and receiver (processing block 501). The packet is received from a network device that is in the communication path between the sender and the receiver.

In response to receiving the packet, processing logic copies the packet to create another packet (processing block 502) and sends the copied packet from the packet switch to a time stamping engine (processing block 503). Processing logic of the time stamping engine adds a timestamp to the copied packet where the timestamp is based on a global clock (processing block 504). Thereafter, processing logic sends the copied packet with the timestamp to the packet switch for forwarding to another device (e.g., a tool) for analysis (e.g., time of flight analysis) with at least another one additional packet that has the time-stamped based on the same global clock (processing block 505). This additional packet may come from another data access device.

An Example of a Packet with a Time Stamp

Figure 6:
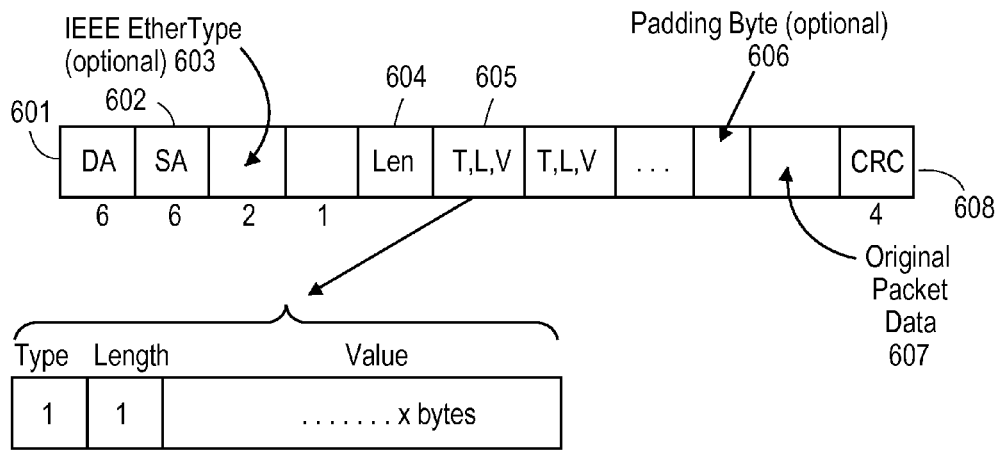
FIG. 6 illustrates an example of a packet that has an added time stamp.

FIG. 6 illustrates an example of a packet that has a time stamp added as described above. Referring to FIG. 6, packet 600 has fields. Field 601 is 6 bytes in length and contains the destination address (DA). Field 602 is 6 bytes in length and contains the source address (SA). Field 603 is 2 bytes in length and contains the IEEE Ethertype (e.g., 22E5). Field 604 is 1 byte in length and contains information specifying the length of the packet. Field 605 contains one or more TLV tuples of type (1 byte), length (1 byte) and value (x bytes). Field 606 is an optional padding byte. Field 607 is the original packet data, and field 608 is 4 bytes in length and contains CRC information. When the time stamp information is added to the packet, the CRC information is recomputed for the packet.

The time stamp is stored in one of the TLV tuples. In particular, the time stamp is stored in the value field with the type field specifying that the value field is a time stamp and the length field specifying the length of the value field (i.e., the length of the time stamp). An example of the time stamp is described below in conjunction with FIG. 7. Note that other types of time stamps may be used. Alternatively, the time stamp and source port information can be added to the end of the packet, right before the CRC checksum. This is shown in FIG. 8. (Note that the Ethertype listed in FIG. 8 is used as a flag only and can be replaced with other flags.) This is advantageous in that tools do have not been modified to deal with this header, and all the parsing functions still operate the same until it comes to this header at the end. Another advantage of putting this header at the front right after the Ethertype is that, for tools that can recognize this header, it does not need to store the whole packet before any interpretation of this header is made. This header can be processed on the fly.

An Example of a Time Stamp

Figure 7:
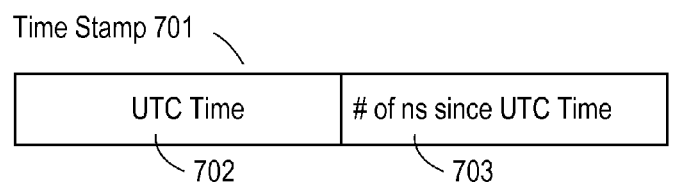
FIG. 7 illustrates an example of a time stamp.
Figure 8:
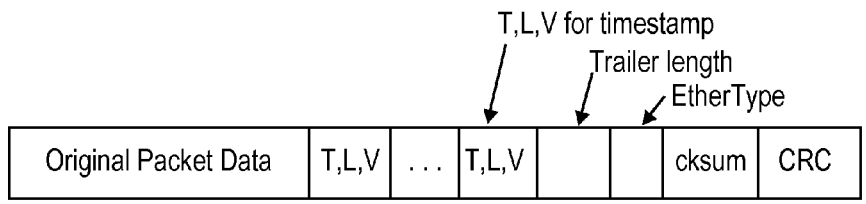
FIG. 8 illustrates an example of a packet with time stamp information added at the end of a packet.

FIG. 7 illustrates an example of a time stamp. The time stamp is a 64-bit time stamp having a time stamp format as in the capture file format of the PCAP file format. Referring to FIG. 7, time stamp 701 has two fields 702 and 703. Field 702 is a 32-bit field containing the UTC time (to the second), while field 703 is a 32-bit field containing information indicating the number of nanoseconds since the UTC time The time stamping engine synchronizes its processor to very high accuracy so that the processor's own clock is very accurate; the processor then uses it own clock to add the time stamp to the packet.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
transmitting a packet in the network from a sender to a receiver through a plurality of devices;
creating a plurality of packets by copying the packet at each of the plurality of devices as the packet is being transmitted through the plurality of devices
adding a time stamp to each packet in the plurality of packets, wherein the time stamps of the plurality of packets are generated based on a global clock;
sending the plurality of packets with their time stamps to a tool, wherein the packet without the time stamp at at least one of the plurality of devices is forwarded downstream for the receiver; and
performing analysis on the plurality of packets using the tool.

2. The method defined in claim 1 wherein the analysis comprises time of flight analysis.

3. The method defined in claim 2 wherein the time of flight analysis determines a bottleneck in the network.

4. The method defined in claim 1 wherein each of the plurality of devices comprises a switch, a router, a tap, a firewall, a gateway, or a node.

5. The method defined in claim 1 wherein the time stamps are generated by time stamp engines synchronized via one selected from a group consisting of GPS, IEEE 1588, a NTP time server or another external time server.

6. The method defined in claim 1 wherein the time stamp is a GPS synchronized time stamp.

7. The method defined in claim 1 further comprising:
receiving, by a packet switch, one of the plurality of packets that is a copy of the packet;
wherein the copy of the packet with the time stamp is sent by the packet switch to the tool.

8. The method defined in claim 7 wherein the packet switch sends the copy of the packet with the time stamp to the tool over the network.

9. The method defined in claim 7 wherein the act of receiving the copy of the packet comprises receiving, at a network port of the packet switch, the copy of the packet.

10. The method of claim 1, wherein the plurality of devices comprises a subset of all devices that participate in a transmission of the packet.

11. The method of claim 1, wherein one of the time stamps is added by a network switch.

12. The method of claim 1, wherein one of the time stamps is added by a time stamping engine that is communicatively coupled to a network device having a tool port for communication with the tool.

13. A communication network comprising:
a sender;
a receiver;
a plurality of network devices coupling the sender to the receiver, to transmit a packet in the network from the sender to the receiver, wherein at least two of the plurality of network devices are operable to create respective copies of the packet as the packet is being transmitted; and
a packet switch communicatively coupled to the at least two network devices, the packet switch configured to obtain time stamps that are associated with the respective copies of the packet, and send the copies of the packet with the respective time stamps to a tool, wherein the time stamps are generated based on a global clock, and wherein the packet without the time stamps is forwarded downstream for the receiver.

14. The network defined in claim 13 further comprising the tool to perform analysis on the copies of the packets with the time stamps.

15. The network defined in claim 14 wherein the analysis comprises time of flight analysis.

16. The network defined in claim 15 wherein the time of flight analysis determines a bottleneck in the network.

17. The network defined in claim 14 wherein each of the plurality of network devices comprises a switch, a router, a tap, a firewall, a gateway, or a node.

18. The network defined in claim 14 wherein the time stamps are generated using time stamp engines synchronized via one selected from a group consisting of GPS, IEEE 1588, a NTP time server or another external time server.

19. The network defined in claim 14 wherein the time stamps are GPS synchronized time stamps.

20. The network of claim 13, wherein the plurality of network devices comprises a subset of all network devices that participate in a transmission of the packet.

21. The network of claim 13, wherein the packet switch is configured to obtain one of the time stamps by creating the one of the time stamps.

22. The network of claim 13, wherein the packet switch is configured to obtain one of the time stamps by receiving the one of the time stamps from another device that creates the one of the time stamps.

23. A method comprising:
  receiving a first packet that is being sent as part of a communication between a sender and a receiver;
  copying the first packet to create a second packet;
  sending the second packet to a time stamping engine;
  adding, by the time stamping engine, a time stamp to the second packet, wherein the time stamp is based on a global clock; and
  sending the second packet with the time stamp to a device for time of flight analysis with at least one additional packet with a time stamp based on the global clock, wherein the first packet without the time stamp is forwarded downstream for the receiver.

24. The method defined in claim 23 wherein the first packet is forwarded for the receiver after copying the first packet.

25. The method of claim 23, wherein the time stamping engine is a part of a network switch having a tool port that is for communication with the device.

26. The method of claim 23, further comprising sending the second packet with the time stamp to a network switch, wherein the act of sending the second packet with the time stamp to the device for time of flight analysis is performed by the network switch after the network switch receives the second packet with the time stamp.

27. An apparatus comprising:
  a packet switch operable to receive a first packet from a network, create a second packet that is a copy of the first packet, and output the first packet on a first port and the second packet on a second port;
  a time stamping engine coupled to the packet switch, the time stamping engine comprising time synchronization hardware to receive a global clock from an antenna and to output a clock signal and time stamp information;
  a processor coupled to receive the second packet from the packet switch and operable to add a time stamp to the second packet based on the clock signal and the time stamp information, the processor coupled to a third port of the packet switch to send the second packet with the time stamp to the packet switch.

* * * * *